United States Patent Office.

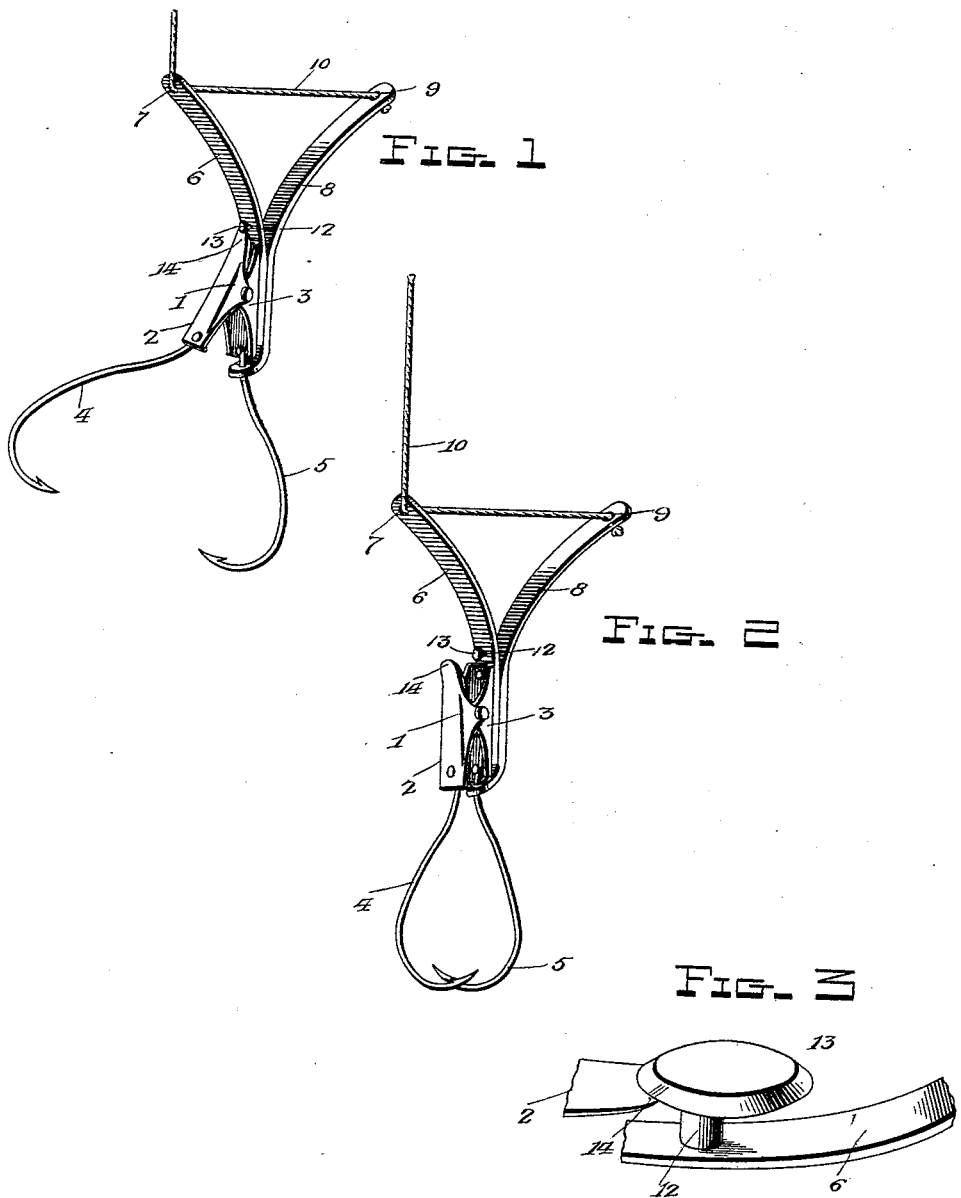

THEODORE A. SCHLAEBITZ, OF LINCOLN, NEBRASKA.

FISH-HOOK.

SPECIFICATION forming part of Letters Patent No. 623,289, dated April 18, 1899.

Application filed August 30, 1898. Serial No. 689,842. (No model.)

*To all whom it may concern:*

Be it known that I, THEODORE A. SCHLAE-BITZ, a citizen of the United States, residing at Lincoln, in the county of Lancaster and State of Nebraska, have invented certain new and useful Improvements in Fish-Hooks; and I do declare the following to be a full, clear, and exact description of the invention, such as will enable others skilled in the art to which it appertains to make and use the same.

My invention relates to a novel form of duplex fish-hook; and the object is to provide a simple and effective device of this character.

To this end the invention consists in the construction, combination, and arrangement of the device, as will be hereinafter more fully described, and particularly pointed out in the claims at the end of this specification.

The accompanying drawings show my invention in the best form now known to me; but many changes in the details might be made within the skill of a good mechanic without departing from the spirit of the invention as set forth in the claims at the end of this specification.

The same reference characters indicate the same parts of the invention.

Figure 1 is a perspective view of my improved duplex fish-hook set for use. Fig. 2 is a similar view showing the hook sprung. Fig. 3 is an enlarged detail view of the trigger-screw.

1 denotes a spring-actuated thumb-clip comprising the counterpart members 2 and 3, the forward ends of which carry the hooks 4 and 5.

6 denotes a rigid curved arm fixed to the member 3 and provided at its outer end with a guide-orifice 7.

8 denotes a resilient arm, also fixed at its inner end to said member 3 and curved in the opposite direction to the rigid arm 6, and its outer end is also provided with an orifice 9 to receive the end of the line 10, the opposite end of which passes through the guide-orifice 7 in the rigid arm 6.

12 denotes the trigger-screw adjustably secured in the spring-arm 8, so that its eccentric head 13 will project into the path of the free end 14 of the member 2 of the thumb-clip 1, as shown in Fig. 1, and retain the hooks 4 and 5 in a separated position, and which is the position of the hooks when baited and set for use.

As soon as the fish strikes one or the other of the hooks the strain on the line causes the flexible arm 8 to give and approach the fixed arm 6, carrying with it the trigger-screw 12, which releases the end 14 of the member 2, thereby causing the hooks to be brought together, as shown in Fig. 2, and thus secure the fish. By means of the eccentric head 13 of the screw 12 the free end 14 of the member 2 can be arranged to engage more or less of the screw-head, so that the strain required to spring the hooks can be adjusted to a nicety.

Having thus fully described my invention, what I claim as new and useful, and desire to secure by Letters Patent of the United States, is—

1. A duplex fish-hook, comprising the spring-actuated members 2 and 3, the hooks 4 and 5 fixed to their outer ends, the rigid arm 6, the spring-arm 8 and the trigger-screw 12 secured in said arm 8 and projecting into the path of the free end 14 of the member 2, substantially as and for the purpose set forth.

2. A duplex fish-hook comprising the spring-actuated members 2 and 3, the hooks 4 and 5, the rigid arm 6 formed with the guide-orifice 7, the spring-arm 8, the line 10 having one end fixed to said spring-arm and the other passing through said guide-orifice in the spring-arm and the trigger-screw 14 adjustably secured in said spring-arm and having its head projecting into the path of the free end of the member 2, substantially as and for the purpose set forth.

3. A duplex fish-hook comprising the spring-actuated members 2 and 3, the hooks, the spring-arm and the trigger-screw formed with an eccentric head projecting into the path of the free end of one of the members, substantially as and for the purpose set forth.

4. A duplex fish-hook comprising the spring-actuated members, the hooks fixed to the outer ends of said members, the spring-arm fixed to the inner end of one of said members and the trigger-screw adjustably secured in said arm and projecting into the path of the inner end of the opposite member, substantially as and for the purpose set forth.

In testimony whereof I have hereunto set my hand in presence of two subscribing witnesses.

THEODORE A. SCHLAEBITZ.

Witnesses:
G. A. HAGENSICK,
ED. C. KUENZEL.